United States Patent [19]

Wörner et al.

[11] Patent Number: 4,776,444
[45] Date of Patent: Oct. 11, 1988

[54] ARRANGEMENT FOR THE SHIFTING OF A MULTI-DISK CLUTCH FOR THE LOCKING OF A TRANSFER DIFFERENTIAL FOR THE DRIVE OF TWO VEHICLE AXLES OF A MOTOR VEHICLE

[75] Inventors: Günter Wörner, Kernen; Arno Röhringer, Ditzingen; Werner Walter, Eislingen, all of Fed. Rep. of Germany

[73] Assignee: Daimler-Benz Aktiengesellschaft, Stuttgart, Fed. Rep. of Germany

[21] Appl. No.: 3,457

[22] Filed: Jan. 15, 1987

[30] Foreign Application Priority Data

Jan. 15, 1986 [DE] Fed. Rep. of Germany ....... 3600876

[51] Int. Cl.⁴ .................... F16D 25/063; F16D 13/75
[52] U.S. Cl. .................. 192/85 CA; 192/70.25; 192/70.27; 192/91 A; 192/111 A; 180/249; 180/233
[58] Field of Search ............ 192/70.25, 70.27, 85 CA, 192/91 R, 91 A, 111 A; 188/71.9, 196 F, 196 V; 180/233, 249; 74/711

[56] References Cited

U.S. PATENT DOCUMENTS

| | | | |
|---|---|---|---|
| 3,410,373 | 11/1968 | Pace | 188/71.9 |
| 3,627,072 | 12/1971 | Smirl | 74/711 |
| 3,742,783 | 7/1973 | Shealy | 192/111 A |
| 4,026,167 | 5/1977 | Archer | 192/91 A |
| 4,243,124 | 1/1981 | Kluger | 188/196 F |

FOREIGN PATENT DOCUMENTS

| | | |
|---|---|---|
| 2805692 | 8/1979 | Fed. Rep. of Germany . |
| 3212495 | 10/1983 | Fed. Rep. of Germany . |
| 3318251 | 11/1984 | Fed. Rep. of Germany . |
| 3345927 | 6/1985 | Fed. Rep. of Germany . |
| 21523 | 6/1971 | Japan ................ 192/91 A |
| 140919 | 8/1982 | Japan ................ 192/91 A |
| 56920 | 4/1983 | Japan ................ 180/233 |
| 2036203 | 6/1980 | United Kingdom ........... 192/91 A |
| 2064702 | 6/1981 | United Kingdom ........... 192/91 R |

Primary Examiner—Leslie A. Braun
Assistant Examiner—David A. Testardi
Attorney, Agent, or Firm—Barnes & Thornburg

[57] ABSTRACT

A device for the shifting of a multi-disk clutch for the locking of a transfer differntial for the drive of two vehicle axles of a motor vehicle, wherein the multi-disk clutch is engaged by means of the force of a spring and is released by means of an axial piston that can be acted upon by working pressure. The axial piston acts upon the set of disks via a pressure ring that, with respect to the disk carrier of one half of the clutch, is fixed in the direction of the clutch axis pointing away from a first counterbearing of the set of disks by a second counterbearing. The first counterbearing of the set of disks is coupled with the disk carrier by means of an adjusting arrangement that works toward displacing the first counterbearing by an additional spring force toward the pressure ring along the clutch axis. In a position of a control valve that brings the disk clutch into the engaged position, the working pressure chamber used for the admission of pressure to the axial piston is connected with a pressure-relieved storage tank via a hydraulic throttling arrangement.

8 Claims, 2 Drawing Sheets

ARRANGEMENT FOR THE SHIFTING OF A MULTI-DISK CLUTCH FOR THE LOCKING OF A TRANSFER DIFFERENTIAL FOR THE DRIVE OF TWO VEHICLE AXLES OF A MOTOR VEHICLE

BACKGROUND AND SUMMARY OF THE INVENTION

The invention relates to a device for the shifting between an engaged and a released position of a multi-disk clutch for the locking of a transfer differential that can be driven by a driving machine, for the drive of two vehicle axles of a motor vehicle.

Such an arrangement has been contemplated in German Unexamined Published Patent Application (DE-OS No. 32 12 495). This device serves to adapt the locking torque of the multi-disk clutch fully automatically to various operating conditions of the vehicle as a function of parameters of the motor vehicle, such as the driving speed, the steering angle or the engine torque. For this purpose, the multi-disk clutch, by means of a hydraulic working pressure, is engaged against a release spring. The release spring is in the form of a plate spring which, in this case, acts as a power reservoir. In this case, the locking effects can be adjusted by the parameters by the control of the working pressure.

In contrast, the objective of the present invention is to allow the multi-disk clutch to operate over an extended operating time with a low energy expenditure in such a way that the working pressure, when the respective shifting signal occurs, always without delay has a predetermined continuously falling course over time.

This objective is achieved by providing a constant contact of the clutch disks in the opened condition ensured over the whole useful life of the clutch. Thus, the arrangement according to the invention can be used advantageously in those cases in which the closing of the multi-disk clutch is particularly critical with respect to time and a defined variation in time of the transferable engine torque is required. Because of the constant contact of the clutch disks, a minimal closing path is made possible.

In addition, the shifting point, i.e., that point in time at which the clutch disks are in complete contact with one another, does not depend on the spring characteristic of the spring means for the engaging of the multi-disk clutch and further does not depend on the installing condition of these means. Further, a settling or a wearing of the clutch disks cannot result in either a shifting of the shifting point or in a lengthening of the shifting process.

A further advantage is provided in that a separate shifting valve is not required which makes available a large flow cross-section until the shifting point is reached and subsequently makes available a reduced flow-off cross-section for the working pressure means.

Further, the shifting noise is low since less pressure medium must flow off because a venting path is lacking.

Finally, costly adjusting work with respect to the spring means for the engaging of the multi-disk clutch is not required.

These and other objects are made available by using a first spring for shifting the multi-disk clutch into engagement, providing an adjustable arrangement having a second spring adjustable with respect to a disk carrier for limiting the displacement of the first counterbearing on the disk carrier to only towards the pressure ring along the clutch axis, providing a second counterbearing fixed with respect to the disk carrier for supporting the pressure ring in the direction away from the first counterbearing along the clutch axis, and providing a hydraulic throttle in the return line which is connected with the working pressure chamber of the axial piston by the control valve to bring the clutch into the engaged position. The first spring is a plate spring applying force directly to the pressure ring which is connected to one end disk of the disk set which is opposite the disk engaged by the first counterbearing. The adjustment arrangement includes a threaded element for connecting the first counterbearing to the disk carrier in addition to the second spring. The threaded element is self-locking and the second spring may be a spiral spring. The disk carrier is immovably fixed on the transmission shaft central to the main axis of the transmission and the second counterbearing includes a retaining ring held in a circumferential groove of the transmission shaft. The second counterbearing may also include a plurality of stop screws in the disk carrier having an axis parallel to the multi-disk clutch axis. The stop screws are at the same distance to the clutch axis as the clutch release means that is applied to the pressure ring.

Other objects, advantages, and novel features of the present invention will become apparent from the following detailed description of the invention when considered in conjunction with the accompanying drawings.

BRIEF DESCRIPTION OF THE DRAWINGS

FIG. 1b is a part-sectional view illustrating another embodiment of the counterbearing of the pressure ring and its torsionally fixed connection according to the device of FIG. 1a.

DETAILED DESCRIPTION OF THE DRAWINGS

Figure 1A:
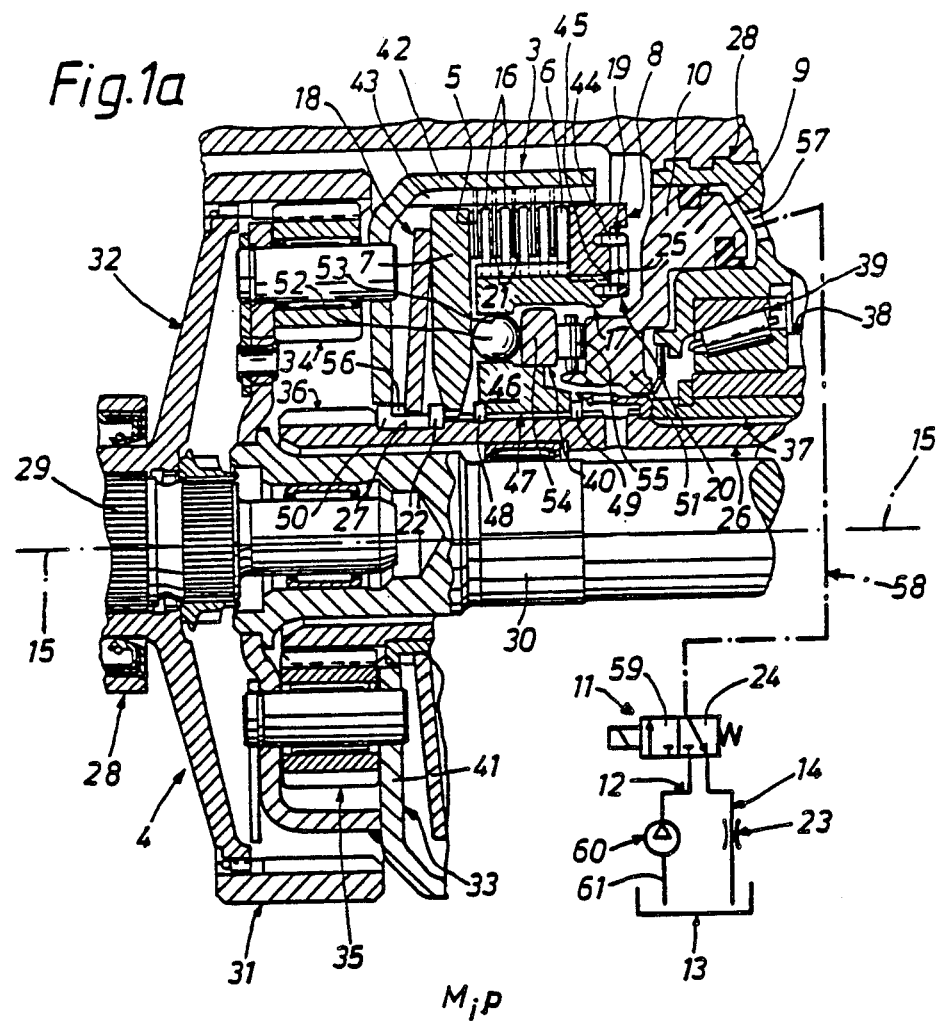
FIG. 1a is a part-sectional view illustrating a transfer differential with a multi-disk clutch used for locking and a device for the engaging and release of the multi-disk clutch in a first embodiment according to the principles of the present invention.

As illustrated in FIG. 1a, the following are arranged in a gear housing 28 of the transfer differential 4 arranged centrally and coaxially with respect to a main axis 15—15 of rotation:

an input shaft 29 that can be driven by a driving machine via a gear change box in a way that is not shown;

an outer central wheel 31 that, by means of a driving web 32, is in a torsionally fixed driving connection with the input shaft 29;

a planetary carrier 33 carrying inner and outer planets 34 and 35 that mate with one another;

an inner center output shaft 30 that in a torsionally fixed way is connected with the planetary carrier;

a ring-shaped inner central wheel 36 that is penetrated by the output shaft 30;

an output shaft 26 that, in a torsionally fixed way, is connected with the inner central wheel 36 and is concentric with respect to the inner output shaft 30;

an outer transmission shaft 37 that is concentric with respect to the output shaft 26;

an input gear wheel 38 that is torsionally fixed on the transmission shaft 37;

a roller bearing arrangement 39 that supports the transmission shaft 37 with the input gear wheel 38 with respect to the transmission housing 28;

a multi-disk clutch 3 arranged between the input gear wheel 38 and the planetary carrier 33;

a pressure ring 7 that can be brought into contact with the end disk 5 adjacent to the planetary carrier 33;

a plate spring 18 that affects the pressure ring 7 directly;

a ring-shaped working pressure chamber 9 of the transmission housing 28 arranged between the multi-disk clutch 3 and the input gear wheel 38;

a ring-shaped axial piston 10 received in the working pressure chamber 9, in an axially slidable way; and a release arrangement 40 that is actuated by the axial piston 10 and affects the pressure ring 7.

As further illustrated in FIG. 1a, the outer central wheel 31 driven by the input shaft 29 mates with the outer planet 34. The inner central wheel 36, in a rotationally fixed way, is connected with the concentric output shaft 26 and mates with the inner planet 35. The inner lateral disk 41 of the planetary carrier 33 that is adjacent to the multi-disk clutch 3 has a drum-type projection 42 at its radially outer area for the forming of a disk carrier. The drum-type projection 42 is provided with inner axial grooves 43 for the torsionally fixed holding of the outer disks 21 of the multi-disk clutch 3.

Inner disks 16 are positioned alternately between the outer disks 21. The inner disks 16, in a corresponding way, are held in a torsionally fixed but axially slidable way in axial grooves of an inner disk carrier 17. The end disk 5, interacting with the pressure ring 7, is held in the outer disk carrier 42. The opposite end disk 6 is held at the inner disk carrier 17 and can be supported at a ring-shaped counterbearing 8. The counterbearing 8 is coupled with the inner disk carrier 17 by means of an adjusting arrangement 20.

The adjusting arrangement 20 essentially provides a threaded connection 25 between the counterbearing 8 and the disk carrier 17. One rotational direction of the thread connection is blocked by self-locking. In the unblocked rotational direction, a spiral spring 19 acts between the disk carrier 17 and the counterbearing 8 in such a way that the counterbearing 8 is shifted in the direction of the pressure ring 7. The outer spring end 44 of the spiral spring 19 engages the counterbearing, while the inner spring end 45 of the spiral spring 19 engages the disk carrier 17.

The inner disk carrier 17 has a hub 46 located inside the disks 6, 16. By means of splines 47, the hub 46 is fixed on the transmission shaft 23 so that it cannot be rotated. By means of retaining rings 48 and 49 on both sides, the hub 46 cannot be slid axially. The transmission shaft 26, used as the output shaft, has a circumferential groove 27 located between the hub 46 and the inner central wheel 36. An angular bearing ring 50 and a retaining ring 22 are immovably fixed in said circumferential groove 27 in the directions of the axis of the clutch and the main axis 15—15 of rotation of the transmission. The retaining ring 22 forms a counterbearing which fixes the pressure ring 7 immovably with respect to the disk carrier 17 along the main axis 15—15 of rotation of the transmission in the direction of the planetary carrier 33.

With the insertion of a supporting ring 56, the bearing ring 50 forms a counterbearing for the plate spring 18 that immovably fixes the radially inner end of the spring with respect to the disk carrier 17 along the main axis 15—15 of rotation of the transmission in the direction of the planetary carrier 33. The release arrangement 40 has a pressure ring 51 that in one piece with the axial piston 10. Via an axial roller bearing 55, the pressure bearing 51 acts on an adjusting ring 54 that actuates the pressure ring 7 in the release direction by means of balls 52 which, in a form-locking way, but with clearance of motion, are guided in axial passages 53 of the hub 46.

A pressure duct 57 leads into the working pressure chamber 9, said pressure duct 57 being connected to a pressure line 58 that leads to a control valve 11. The control valve 11 is shown in a position 24 that is shifted by the force of a spring. In position 24, the pressure line 58 is connected with a return line 14 leading to a pressure relieved storage tank 13. The return line 14 contains a hydraulic throttling arrangement 23. In a position 59 of the control valve 11 that is triggered by an electric shifting signal, the pressure line 58 is connected with a working pressure line 12, that is connected to the pressure side of a pressure medium pump 60. The pressure medium pump 60, via a line 61, takes in pressure medium from the storage tank 13.

In position 24 of the control valve 11, the working pressure chamber 9 is relieved via the return line 14 so that the disk clutch 3 is completely engaged by the plate spring 18. Thus the inner central wheel 26 is essentially rigidly connected with the planetary carrier 33 so that the differential transmission is locked and rotates as a block, causing the input shaft 29 to be rigidly connected with the output shaft 30.

When the control signal 11 is shifted into its position 59, by means of an electrical shifting signal, the return line 14 is blocked with respect to the pressure line 58. Pressure line 58 is connected with the working pressure line 12. As a result, the axial piston 10 in the working pressure chamber 9 is acted upon by pressure and actuates the pressure ring 7 to its released end position at its counterbearing 22, via its pressure ring 51 and the release arrangement 40.

In this position of the pressure ring 7, the disks 21 and 5 of the outer disk carrier 42 are without any significant torque-transmitting engagement with respect to the disks 6, 16 of the inner disk carrier 17 so that the multi-disk clutch 3 is released. But the individual disks still rest against one another and an essential venting play therefore does not exist. If settling or wear phenomena should have occured at the pressure ring 7, the disks 5, 6, 16 21 or at the counterbearing 8, these are compensated by the adjusting arrangement 20 so that no venting play will occur at the multi-disk clutch 3 over its whole useful life.

Figure 2:
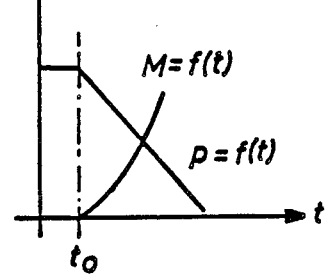
FIG. 2 is a graph diagramming the clutch torque M and the working pressure p with respect to the shifting time t, showing the shifting behavior of the device according to the invention of FIG. 1.

According to FIG. 2, if at the point in time $t_0$, a shifting signal or a shifting pulse takes place for the engaging of the multi-disk clutch 3, it is demonstrated that the working pressure in the working pressure chamber 9 falls off without delay, namely with an approximately linear characteristic according to the characteristic of the hydraulic throttling arrangement 23. In the same way, the clutch torque M rises without delay and approximately progressively over the time.

The input gear wheel 38 with its transmission shaft 37 can be driven directly by the output shaft 26 or by means of the insertion of an additional shiftable multi-disk clutch.

Figure 1B:
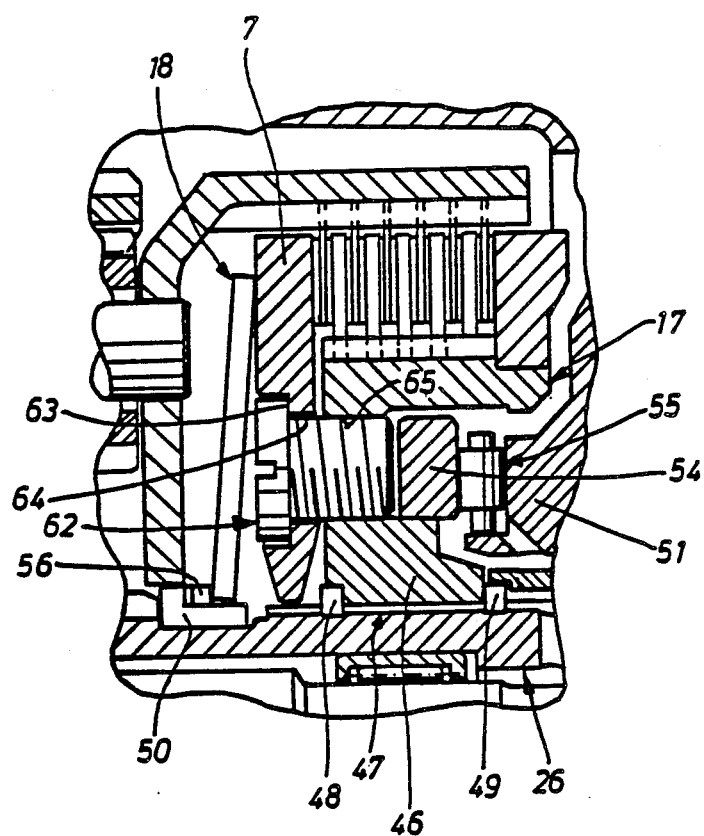

In the case of the embodiment, as illustrated in FIG. 1b, instead of the retaining ring 22 of FIG. 1a, a plurality of stop screws 62 are used as the counterbearing for the pressure ring 7. The studs of said stop screws 62 are screwed into threaded bores 65 in the hub 46 of the disk carrier 17, the axes of which are parallel to the clutch axis, and penetrate corresponding passages 64 in the pressure ring 7. As the actual counterbearing, the screwheads of the stop screws 62 interact with corresponding projections 63 at the passages 64. The pressure ring 7, via its passages 64, may also be torsionally fixed with respect to the disk carrier 17, in which case the hub 46 of the disk carrier 17, in correspondence with the embodiment of FIG. 1b and via corresponding splines 47 and retaining rings 48 and 49 on both sides, is fixed immovably on the concentric output shaft 26. The concentric output shaft 26 also has the counterbearing for the support of the plate spring 18 engaging the clutch via the pressure ring 7 by means of spacer rings 50, 56. The stop screws 62 are arranged on the same radius with respect to the clutch axis as the pressure ring 51 of the working pressure piston that acts upon the pressure ring 7 in the sense of a release via the adjusting ring 54 and the balls that are not located in the plane of the drawing.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A shifting device for the shifting, between an engaged and a released position, a multi-disc clutch for the locking of a transfer differential that can be driven by a driving machine, for the drive of two vehicle axles of a motor vehicle having a first spring means for shifting the multi-disc clutch into one of said positions and a hydraulic auxiliary force means for shifting the multi-disc clutch into the other of said positions, said first spring means and said hydraulic auxiliary force means shifting the multi-disc clutch via a pressure ring arranged movably in both directions of the multi-disc clutch axis and acting against one of two end clutch discs of the multi-disc clutch, a first counterbearing means mounted via an adjusting means to compensate for wear in the clutch discs of the multi-disc clutch by movement exclusively along the clutch axis in the direction toward the pressure ring relative to a first disc carrier that in a torsionally fixed way holds at least one of the clutch discs of the multi-disc clutch, said counterbearing means contacting against the other of the two end discs of the clutch discs, said auxiliary force means having an axially movable piston received in a non-rotatable cylinder acted upon by a working pressure chamber that is connected by a control valve to a working pressure line that can be pressurized by a working pressure and to a return line that leads to an essentially pressure-relieved storage tank and said axial piston having a drive connection means to said pressure ring, said first spring means shifting the multi-disc clutch into the engaged position;

said adjusting means having a second spring means adjustable with respect to the disc carrier for limiting the movement of the first counterbearing means to only along the clutch axis toward the pressure ring;

a second counterbearing means for supporting the pressure ring in the direction away from the first counterbearing means along the clutch axis; a second disc carrier discrete from said pressure ring and holding the remainder of the clutch discs of the multi-disc clutch; and a hydraulic throttling means arranged in the return line that upon a positioning of the control valve that brings the multi-disc clutch into the engaged position is connected to the working pressure chamber and to the pressure relieved storage tank.

2. A device according to claim 1, wherein said first spring means includes a plate spring means applied directly at the pressure ring.

3. A device according to claim 2, wherein said adjusting means includes a thread means for connecting the first counterbearing means with the disc carrier by means of screw motions as well as by said second spring means.

4. A device according to claim 3, wherein the thread means if self-locking.

5. A device according to claim 4, wherein the second spring means is a spiral spring.

6. A device according to claim 5, wherein the first disc carrier is immovably fixed on a transmission shaft that is centrally arranged with respect to the axis of rotation of the multi-disc clutch and, said second counterbearing means includes a retaining ring held in a circumferential groove of the transmission shaft.

7. A device according to claim 5, wherein said second counterbearing means includes a plurality of stop screws received within the first disc carrier and having axes parallel to the multi-disc clutch axis.

8. A device according to claim 7, wherein the stop screws are the same distance as the drive connection means that is applied at the pressure ring.

* * * * *